W. J. RIDDELL.
LOCKING DEVICE FOR LEVERS OF MOTOR VEHICLES.
APPLICATION FILED DEC. 14, 1911.
1,043,726.
Patented Nov. 5, 1912.
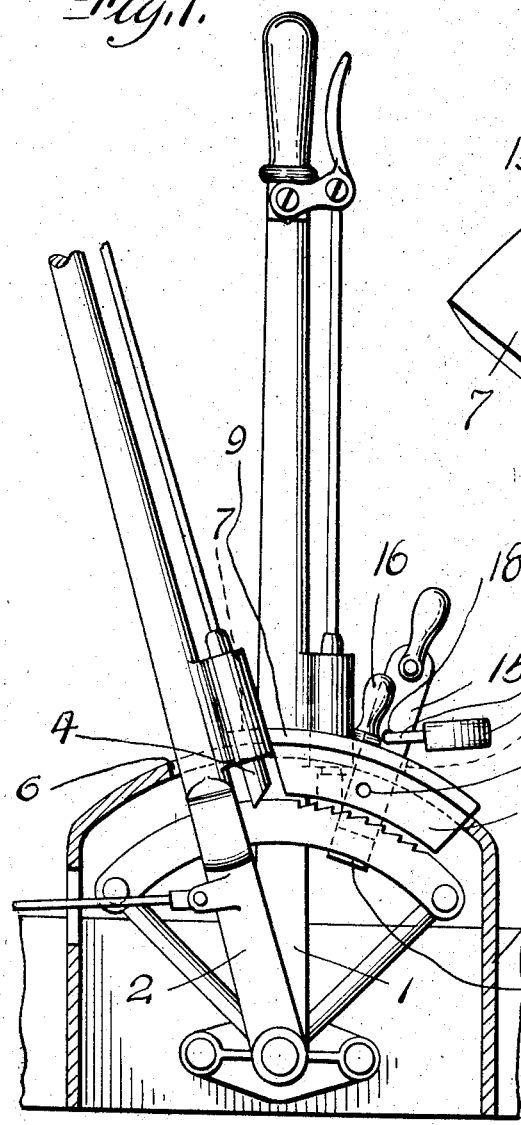
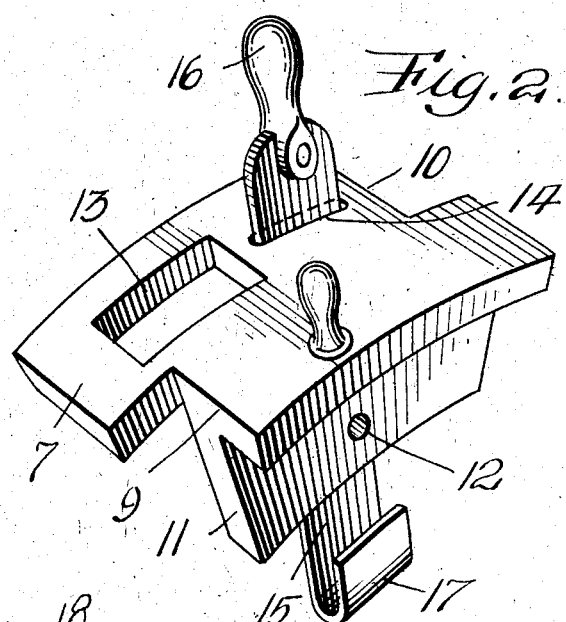
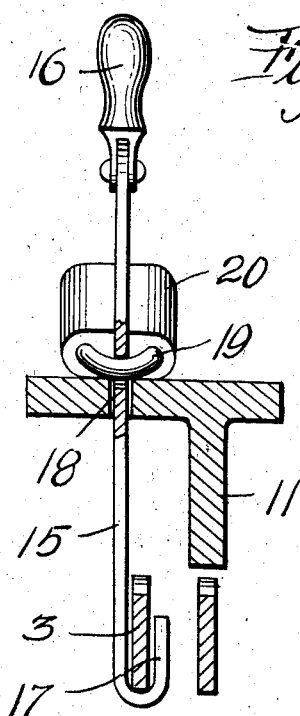
WITNESSES
INVENTOR
W. J. Riddell.
BY
ATTORNEYS

UNITED STATES PATENT OFFICE.

WILLIAM J. RIDDELL, OF PITTSBURGH, PENNSYLVANIA.

LOCKING DEVICE FOR LEVERS OF MOTOR-VEHICLES.

1,043,726.  Specification of Letters Patent.  Patented Nov. 5, 1912.

Application filed December 14, 1911. Serial No. 665,795.

*To all whom it may concern:*

Be it known that I, WILLIAM J. RIDDELL, a citizen of the United States of America, residing at Pittsburgh, in the county of Allegheny and State of Pennsylvania, have invented certain new and useful Improvements in Locking Devices for Levers of Motor-Vehicles, of which the following is a specification, reference being had therein to the accompanying drawing.

This invention relates to a locking device for the levers of a motor vehicle and has for its object to provide means in a manner as hereinafter set forth for locking the brake and operating levers of an automobile or other vehicle in the position to which they have been set.

Although the locking device is designed primarily for use in connection with the levers of a motor vehicle, it is to be understood that the device is adapted for any purposes wherein it is found applicable.

Further objects of the invention are to provide a locking device for the brake and operating levers of an automobile or other vehicle which is comparatively simple in its construction and arrangement, strong, durable, efficient and convenient in its use, readily set up with respect to the levers, and inexpensive to manufacture.

With the above and other objects in view, the invention consists of the novel construction, combination and arrangement of parts as hereinafter more specifically described and illustrated in the accompanying drawings, wherein is shown a preferred embodiment of the invention, but it is to be understood that changes, variations and modifications can be resorted to which come within the scope of the claims hereunto appended.

In describing the invention in detail, reference is had to the accompanying drawing, wherein like reference characters denote corresponding parts throughout the several views, and in which—

Figure 1 is a side elevation partly in section showing the adaptation of a locking device in accordance with this invention in connection with the brake and gear levers of an automobile; Fig. 2 is a perspective view of the locking device minus the locking member; Fig. 3 is a sectional detail of the locking device with the locking member in operative position.

Referring to the drawings in detail, 1 denotes the gear-operating lever and 2 the brake-operating lever of an automobile. The reference character 3 denotes the racks which are engaged by the locking bolts 4 of the levers.

In the motor vehicle as now set up, the lower portions of the levers and their associate racks are inclosed in a casing 5 which is provided with a slot 6 to permit of the oscillating of the levers when occasion so requires.

A locking device in accordance with this invention includes an arcuate body portion 7, cut away at diagonally opposite corners to provide shoulders 9 and 10. Formed integral with and depending from the body portion 7 is a segment-shaped rib 11 having an opening 12, the function of the rib 11 and opening 12 will be presently referred to. The body portion 7 is formed with a rectangular opening 13 and a longitudinally extending slot 14. The opening 13 is for the passage of the lever 1, while the slot 14 is for the passage of a hook-shaped locking arm 15 provided at its outer end with a handle 16 and at its inner end with a hook 17. The locking arm 16, intermediate its ends, is provided with an opening 18 for the passage of the shackle 19 of the locking member 20.

The locking device is set up with respect to the levers in the following manner: The body portion 7 is mounted upon the casing 5 with the rib 11 extending through one of the slots 4 and arranged over one of the racks 3, when in such position the lever 1 extends through the opening 13. The locking arm 15 is then so positioned that its hooked end 17 will engage under one of the racks 3. The locking member 20 is then mounted in the position as shown in Fig. 3 and which will prevent the body portion from being removed as is obvious. The shoulder 9 will arrest movement in one direction of the lever 2 as the member 7 almost fills that slot 4 which associates with the lever 2. Movement of the lever 1 is arrested by the end walls of the opening 13 and movement of the locking member in one direction is prevented by the engagement of the rib 11 with the end wall of one of the slots 6. Movement in the other direction is arrested by the lever 2. It is obvious that when the parts are set up in the manner as stated, that the levers 1 and 2 are locked from movement.

In case the motor vehicle is not provided with a casing 5 to inclose the lower portions of the levers 1 and 2 and their racks, the rib 11 is made of such length as to extend to a point below the racks 3, the rib being positioned between the two racks, the locking member is then inserted through the opening 12 and locked, which will prevent the body portion 7 from being separated from the racks.

What I claim is:

A locking device for levers of motor vehicles comprising the combination with the levers and their racks, of a casing inclosing said racks and the lower portions of said levers, said casing provided with parallel slots through which extend said levers, an arcuate member mounted upon said casing and having a depending rib extending through one of said slots, said rib of less length than the length of that slot in which it is positioned and extending in proximity to one end wall of the slot and further extending in proximity to the lever which projects through said slot, said member further provided with a rectangular opening for the passage of the other of said levers, the end walls of said opening arresting movement of the lever, said member having one end provided with a shoulder to arrest the movement of that lever which extends through the slot in which is arranged the rib, said member provided with a slot, a locking arm extending through the slot of said member and having a hook-shaped lower end engaging one of said racks, and a locking member extending exteriorly of said arcuate member and connected to said locking arm to prevent removal of the latter.

In testimony whereof I affix my signature in the presence of two witnesses.

WILLIAM J. RIDDELL.

Witnesses:
 MAX H. SROLOVITZ,
 CHRISTINA T. HOOD.